Patented June 30, 1942

2,288,409

UNITED STATES PATENT OFFICE 2,288,409

FREE-FLOWING SALT COMPOSITION

Alfred Lippman, Jr., and Rock L. Comstock, Weeks, La., assignors to Bay Chemical Company, Inc., New Orleans, La., a corporation of Louisiana No Drawing. Application May 28, 1940, Serial No. 337,732

7 Claims. (Cl. 99—143)

This invention relates to compositions of salt that are both free-flowing and non-caking. Ordinary salt or sodium chloride will be illustrative of this invention.

Salt absorbs moisture readily from the air even under normal atmospheric conditions. Consequent dampening and compacting impede free flow of the salt. For instance, salt for domestic use in humid weather does not sift readily from salt shakers even when the shaker is tapped. In a drier atmosphere, the moisture evaporates. But the salt, left in caked condition, yet does not flow freely. Consequently, one expedient is to add to the salt such powders as finely divided magnesium carbonate, calcium carbonate, calcium phosphate or starch. Others add such substances as oatmeal to absorb moisture preferentially. Some add rice to keep the caked salt broken up. Nevertheless, there is need to improve the flowability of salt. This problem occurs not only in domestic uses of salt but occurs likewise in commercial operations where salt must flow, for example from storage bins or through weighing chutes. In these large quantity commercial operations the particularly troublesome tendency is of the salt to cake.

Addition of even the best of drier powders in use today such as magnesium carbonate, calcium carbonate, starch, calcium phosphate, often as much as 2%, fails to prevent considerable retardation of flow of salt on damp days and to prevent some caking on return of drier atmosphere. Some anti-caking agents such as glycerine or calcium or magnesium chloride may keep the salt moist and uncaked but will not maintain flow of salt. A purpose of this invention is to overcome tendencies both of dampness and of caking to hinder salt from flowing. A further purpose is to resist agglomeration of hygroscopic salts. An additional purpose is to keep fine salt in fluent condition. An additional purpose is to improve the flowability even of dry salt. Also an object is to provide compositions particularly of hygroscopic salts that are both free-flowing and non-caking. These and other purposes will be apparent in the following description of this invention. The novel inventive features will be particularly pointed out in the appended claims.

Various beneficial effects of this invention become apparent on adding to salt non-soluble material that is water-repellent. Preferably the added material is finely divided solid. Specifically, these benefits are illustrated by adding to salt a relatively small quantity of aluminum stearate. However, other similar substances also are within the purview of this invention, particularly water-insoluble soaps.

To illustrate, tests were made with table salt (rock mine salt). The salt particles were of such size that about 23% remained on a 35 U. S. standard screen, about the same quantity on a 40 screen and about 42% on a 60 screen. About 6% went through an 80 screen. Thus the salt was preponderantly between 20 and 60 mesh. To this sample of salt was added aluminum stearate of technical grade and of particle size such that about 6% remained on a 100 screen; about 22% on a 200 screen and about 9% on a 325 screen; about 63% went through a 325 screen. Magnesium carbonate of standard best grade was used where specified in the following tests:

In each test, one of the following substances was mixed with 100 grams of salt by rolling: (1) aluminum stearate alone, or (2) magnesium carbonate alone, or (3) aluminum stearate first and then magnesium carbonate, marked "separate" in the tables below, or (4) aluminum stearate premixed with magnesium carbonate, marked "premixed" in the tables below. Then a 10 gram portion was levelled in a 50 mm. o. d. culture dish and exposed in a desiccator to an atmosphere of 88% relative humidity at about 77° F. Dishes on removal were weighed. Flowability was determined by placing 10 grams of damp salt from the culture dish into a porcelain household salt shaker ⅝ in. by ⅝ in. square internally having nine holes each $\frac{3}{32}$ in. diameter in top. The top was about $\frac{3}{32}$ inch thick. The shaker was inverted and tapped at a uniform rate of five times per second. The time in seconds required to discharge the 10 grams of salt represents inversely the flowability of the salt. After this test the salt was immediately returned to the culture dish and kept in a desiccator over calcium chloride until the moisture was removed to constant weight. Then the dish was inverted upon a 20 mesh screen and the screen tapped gently. The percentage of salt remaining on the screen is the index of caking.

TABLE I

FIRST SET.—*Exposure of 21 hours in desiccator to 0.81% moisture, average*

| Substances added to salt | Seconds required for flow of 10 grams |
|---|---|
| Nothing added—salt alone | 580 |
| 0.05% aluminum stearate | 229 |
| .1% aluminum stearate | 212 |
| .2% aluminum stearate | 167 |
| .3% aluminum stearate | 126 |
| .5% aluminum stearate | 65 |
| 1% magnesium carbonate | 65 |

SECOND SET.—*Exposure of 41 hours in desiccator to 1.25% moisture, average*

| Substances added to salt | Seconds required for flow of 10 grams |
|---|---|
| Nothing added—salt alone | 1,512 |
| 0.05% aluminum stearate | 1,080 |
| .2% aluminum stearate | 510 |
| .5% aluminum stearate | 109 |
| 1% magnesium carbonate | 278 |

TABLE II

FIRST SET.—*Exposure for 21 hours in desiccator to 0.93% moisture, average*

| Substances added to salt | Seconds required for flow of 10 grams |
|---|---|
| None—salt alone | 580 |
| 1% magnesium carbonate | 65 |
| 1% magnesium carbonate +.025% aluminum stearate, separate | 19 |
| 1% magnesium carbonate +0.10% aluminum stearate, separate | 15 |

SECOND SET.—*Exposure for 41 hours in desiccator to 1.55% moisture, average*

| Substances added to salt | Seconds required for flow of 10 grams |
|---|---|
| None—salt alone | 1,512 |
| 1% magnesium carbonate | 278 |
| 1% magnesium carbonate +.025% aluminum stearate, premixed | 28 |
| 1% magnesium carbonate +.05% aluminum stearate, premixed | 24 |
| 1% magnesium carbonate +0.025% aluminum stearate, separate | 127 |
| 1% magnesium carbonate +.05% aluminum stearate, separate | 46 |

None of the samples above was caked sufficiently to secure a quantitative test, but all samples except those with premixed stearate and carbonate had plainly observed loose lumps, in contrast to the superior anti-caking qualities of the stearate-carbonate mixture.

It is evident from Table I that in the first set of tests 0.5% aluminum stearate maintained as good flow of salt as did 1% magnesium carbonate. In the second set of tests shown in Table I with moister sample, 0.5% aluminum stearate gave 2.7 more rapid flow than did 1% magnesium carbonate.

Water repellent substances may be admixed with ordinary drier and the mixture added to the salt, or water repellent substances may be added to the salt separately from the powdered drier. However, adding the two as a mixture to the salt is preferable, as is shown in Table II. Thus even such a small percentage as 0.025% aluminum stearate admixed with 1% magnesium carbonate decreased the time of flow from 278 seconds with carbonate alone to the exceedingly low time of only 28 seconds. This is a ratio of change of 10:1 due to the mixture comprising about 40 times as much of magnesium carbonate as of stearate. On the other hand, changes of as much as 0.2% in the carbonate affected the flowing time less than one-third. Similarly, as shown in Table I, increase of six times in concentration of stearate alone from 0.05% to 0.3% decreased the time of flow by less than 50%. That is, even relatively large additions of either carbonate alone or of stearate alone provide comparatively less improvement in flowability of salt than addition of very small percentages of stearate intermixed with magnesium carbonate. The mixture results in marked increase of several hundred per cent effectiveness. Explanation of these improvements is not limiting but may serve to clarify proper practice of this invention.

It appears that when moisture is deposited on surfaces of salt particles it dissolves some of the salt to form a coating of solution over the surfaces. Thus adjoining particles of salt become linked together by films of solution that extend from the one particle to the other. The particles thus linked flow sluggishly, but when the atmosphere dries and the solution evaporates the particles remain bonded or cemented together because of salt crystallized from the evaporated solution. Thus the particles are caked. When insoluble powders such as magnesium carbonate are present, their fine light particles become distributed over the surface of the salt particles to act as separators of crystals. With such reduction of direct contact between crystals, opportunity is minimized for the salt to cake. But, magnesium carbonate and the like do not repel water, so salt solution on surfaces of the particles may spread over the separating powder and large adjacent salt crystals. The result is salt that cakes. However, stearate and the like, being water-repellent, apparently prevent such spread of water and tend to keep the salt solution on each salt particle better restricted to that particle. Furthermore, stearate is a smooth lubricant, while magnesium carbonate is a rough, irregular crystal not serving as lubricant. In addition when stearate or the like is distributed over the carbonate particles before addition to salt, the fine stearate-coated particles are much more effective than otherwise.

Although aluminum stearate has served to illustrate the principles of this invention aluminum palmitate also is excellent. Moreover, not only aluminum soaps are effective but also other metal soaps, including alkali earth metal and magnesium soaps, particularly stearates or palmitates. These substances are designated herein as water repellent solids. They are primarily solids capable of extremely fine division but the invention is not restricted thereto. Magnesium carbonate, calcium phosphate and the like are designated herein simply as inert anti-caking powders.

Suitable quantities of inert anti-caking powder will vary from about 0.5 to 2%. Suitable quantities of water repellent solid such as water-insoluble metal soap will vary from about 0.01% to 1.5% relatively to the salt. The powder constitutes about 40 times as much of the composition as does the soap, but as is evident may vary somewhat from that proportion. Such metal soap may vary from about 0.01% to 5.0%, the higher amounts particularly being useful when the water-insoluble metal soap is used without the inert anti-caking powder.

In this description common salt or sodium chloride has served to illustrate this invention but other hygroscopic salts or hygroscopic particles of any sort are included within the scope of this invention and regarded as equivalent under the general designation of salt.

In accordance with the patent statutes, the principles of this invention have been illustrated by a preferred embodiment thereof, but it will now be apparent to those skilled in the art that modifications and alterations may be practiced within the scope of the appended claims.

What we claim is:

1. A process of improving the flowing qualities of hygroscopic salt composition comprising adding thereto about 1 to 2% inert anti-caking powder premixed with about $\frac{1}{40}$ of its weight of essentially water-insoluble, water repellent metal soap.

2. A process of improving the flow and anti-caking qualities of hygroscopic salt compositions comprising admixing about 40 parts by weight of inert anti-caking powder with about 1 part by weight of finely powdered water-insoluble fatty acid salt and mixing about 1.0% of this mixture with the hygroscopic salt.

3. A process of improving the flow and anti-caking qualities of hygroscopic salt compositions comprising admixing about 40 parts by weight of magnesium carbonate with about 1 part by weight of calcium stearate and mixing about 1.0% of this mixture with the hygroscopic substance.

4. An improved salt composition of free flowing and of non-caking qualities comprising intermixed with the salt, inert powder and essentially water-insoluble, water repellent metal salt of a fatty acid to the amount of about 0.025% of the composition constituting about $\frac{1}{40}$ of the weight of the inert powder.

5. An improved salt composition of free flowing and of non-caking qualities comprising intermixed with the salt, inert powder containing aluminum soap of particle size preponderantly finer than 325 standard mesh and in amount about $\frac{1}{40}$ of the weight of inert powder and about 0.025% of the salt.

6. A composition of hygroscopic salt of improved free flowing and non-caking qualities comprising salt of particle size from 20 to 60 standard mesh with about 0.5% to 1.5% of a drier of the group consisting of magnesium carbonate, calcium carbonate and calcium phosphate intermixed with about $\frac{1}{40}$ its weight of aluminum soap.

7. A composition of hygroscopic salt of improved free flowing and non-caking qualities comprising salt of particle size from 20 to 60 standard mesh with about 0.5% to 1.5% of a drier intermixed with about 0.025% soap selected from the group consisting of stearate and palmitate of calcium, magnesium and aluminum.

ALFRED LIPPMAN, Jr.
ROCK L. COMSTOCK.